United States Patent
Okunev et al.

(10) Patent No.: US 6,516,462 B1
(45) Date of Patent: Feb. 4, 2003

(54) CACHE MISS SAVING FOR SPECULATION LOAD OPERATION

(75) Inventors: Sergev K. Okunev, Moscow (RU); Vladimir Y. Volkonsky, Moscow (RU)

(73) Assignee: Elbrus International, George Town Grand Cayman (KY)

( * ) Notice: Subject to any disclaimer, the term of this patent is extended or adjusted under 35 U.S.C. 154(b) by 0 days.

(21) Appl. No.: 09/506,429

(22) Filed: Feb. 17, 2000

Related U.S. Application Data

(60) Provisional application No. 60/120,526, filed on Feb. 17, 1999.

(51) Int. Cl.$^7$ .................................................. G06F 9/45
(52) U.S. Cl. ........................ 717/154; 717/159; 717/161; 712/235; 712/237
(58) Field of Search ................................ 717/151–161; 712/233–239; 711/118–137; 714/722

(56) References Cited

U.S. PATENT DOCUMENTS

| | | | | |
|---|---|---|---|---|
| RE35,794 E | * | 5/1998 | Johnson | 711/220 |
| 5,923,871 A | | 7/1999 | Gorshtein et al. | 712/221 |
| 6,332,214 B1 | * | 12/2001 | Wu | 717/141 |

OTHER PUBLICATIONS

Scott A. Mahlke et al., "Integrated predicated and speculative execution in the IMPACT EPIC architecture", Apr. 1998, ACM SIGARCH Computer Architecture News, Proceedings of the 25th annual international symposium on Computer architecture, vol. 26 Issue.*

Schlansker M., and Kathail V., "Critical Path Reduction for Scalar Programs", 1995, Microarchitecture, Proceedings of the 28th Annual International Symposium, pp. 57–69.*

* cited by examiner

Primary Examiner—Tuan Q. Dam
Assistant Examiner—Tuan A Vu
(74) Attorney, Agent, or Firm—Townsend and Townsend and Crew LLP

(57) ABSTRACT

Compiler optimization methods and systems for preventing delays associated with a speculative load operation on a data when the data is not in the data cache of a processor. A compiler optimizer analyzes various criteria to determine whether a cache miss savings transformation is useful. Depending on the results of the analysis, the load operation and/or the successor operations to the load operation are transferred into a predicated mode of operation to enhance overall system efficiency and execution speed.

9 Claims, 5 Drawing Sheets

→ data flow dependence
- - → predicate dependence

After transformation
(Successors of the LOAD_OP is under predicates)

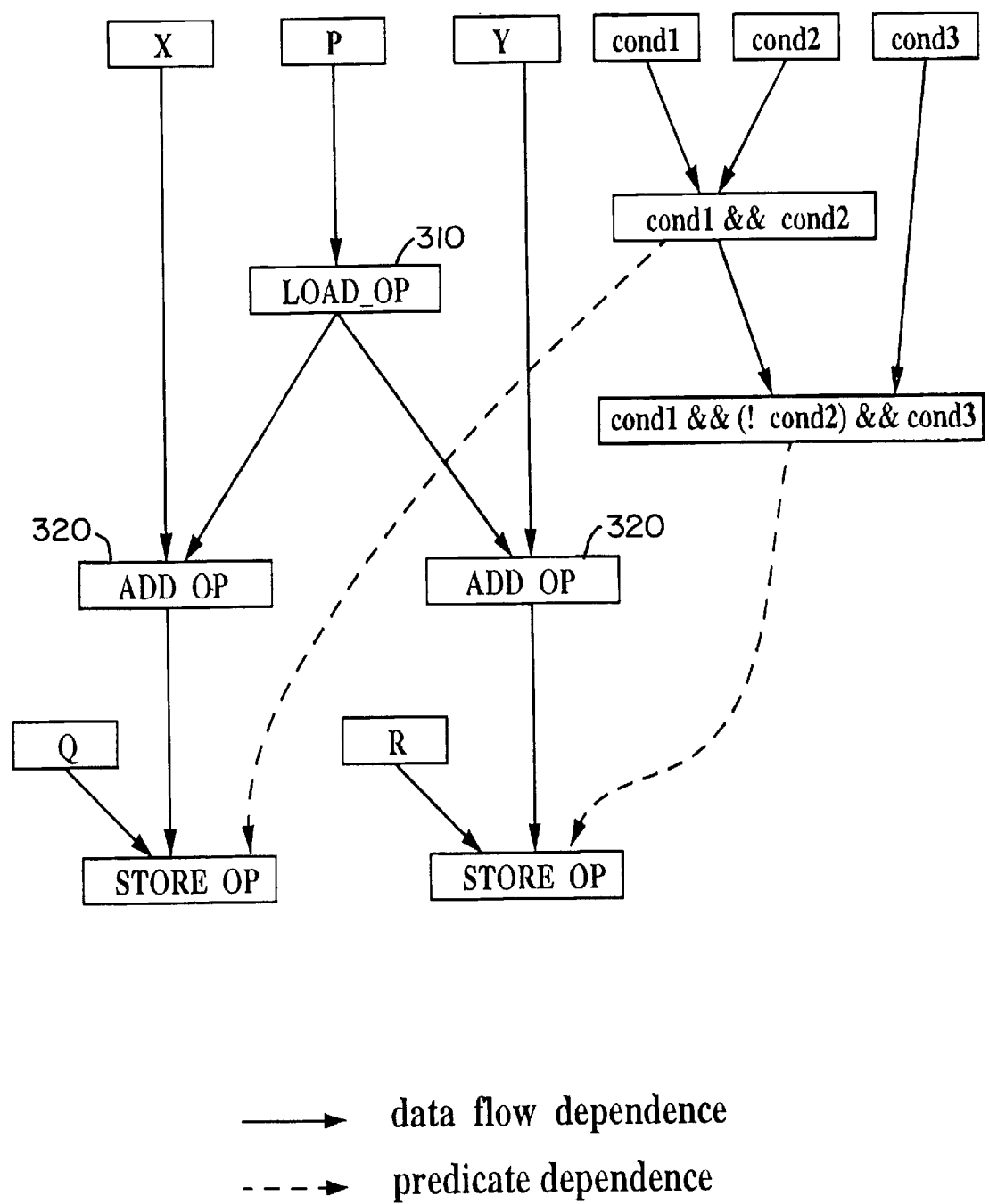
Fig. 3 Before transformation

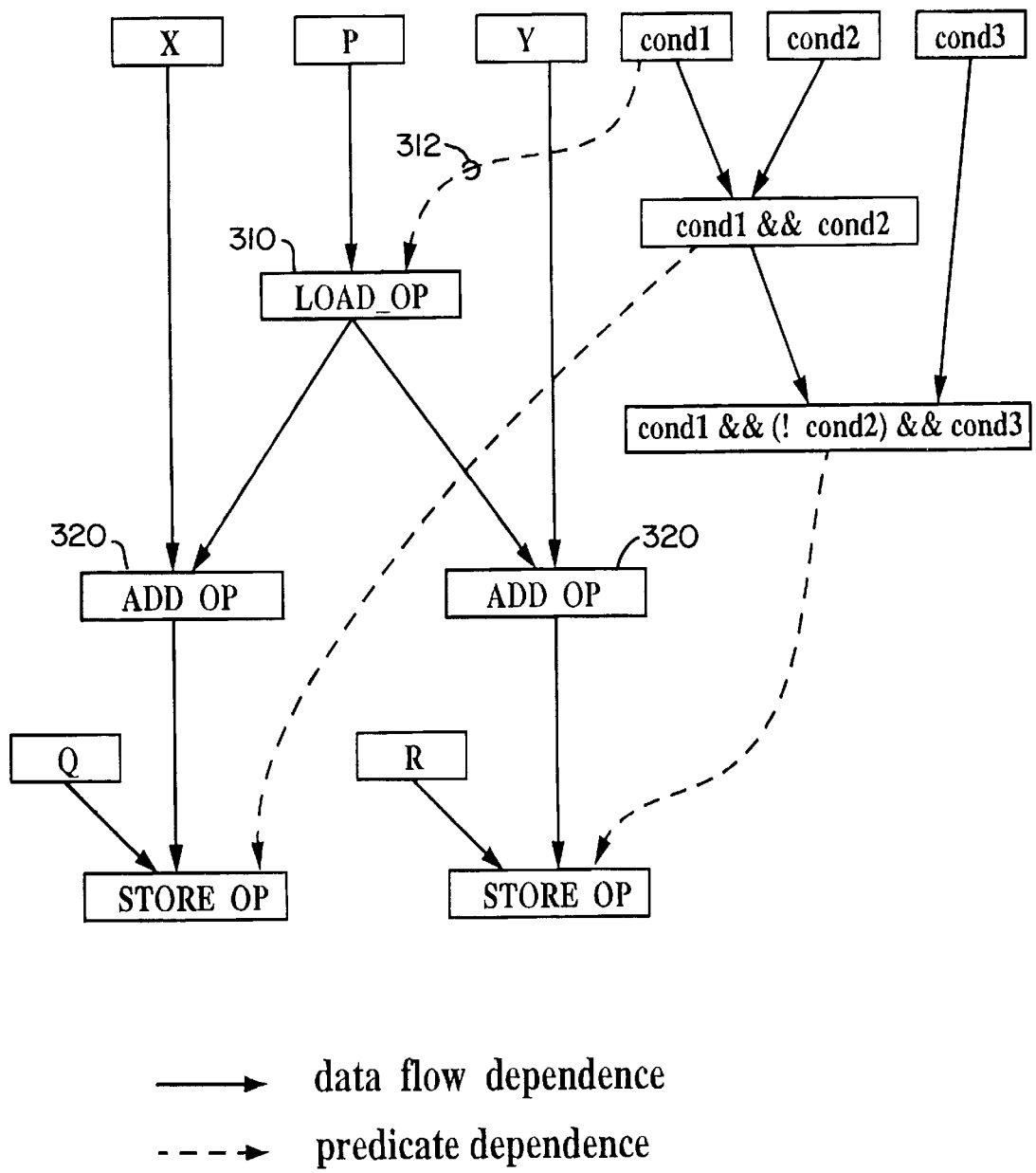
Fig. 4 After transformation
(LOAD_OP is under predicate)

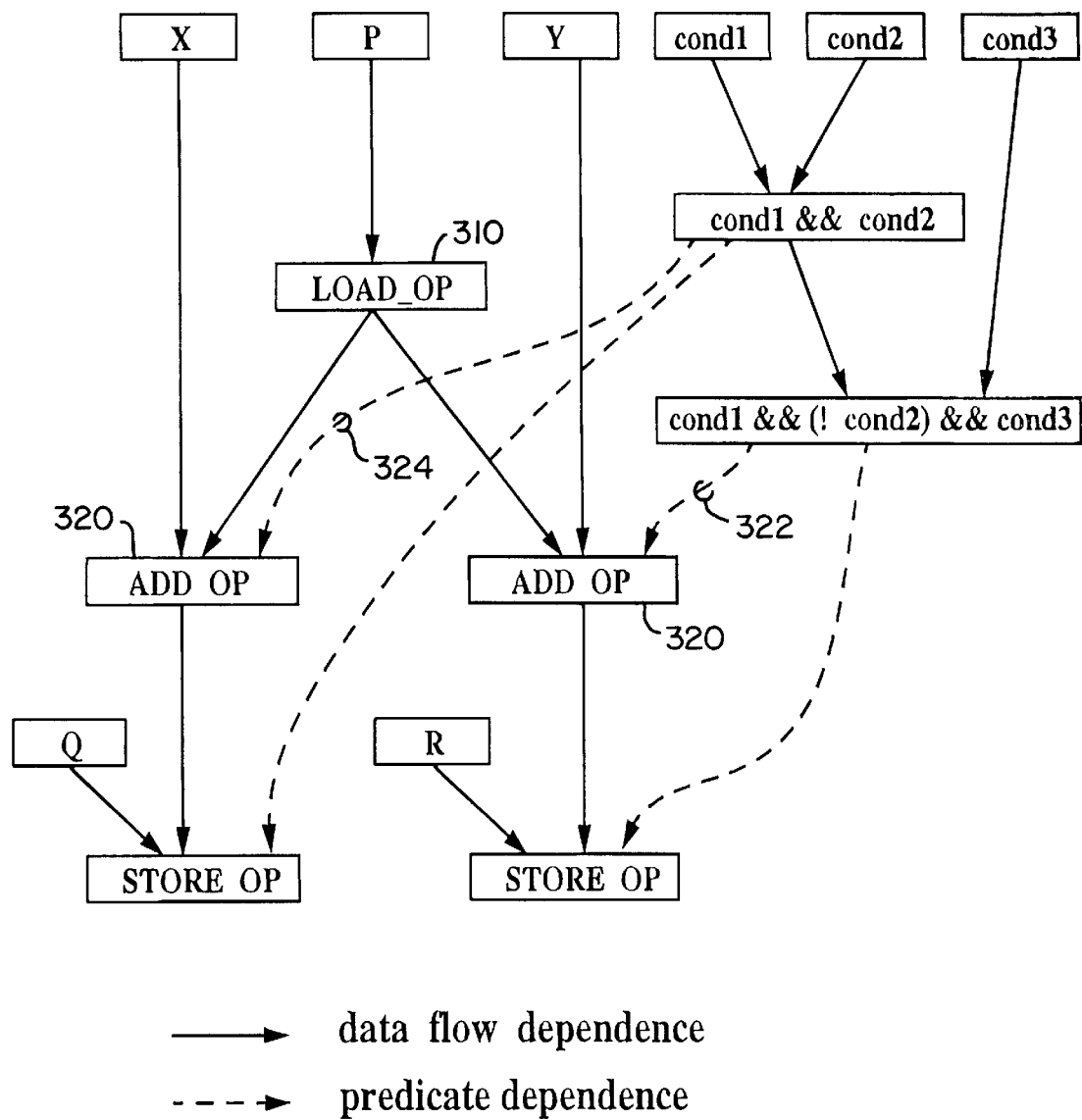
Fig. 5 After transformation
(Successors of the LOAD_OP is under predicates)

CACHE MISS SAVING FOR SPECULATION LOAD OPERATION

CROSS REFERENCES TO RELATED APPLICATIONS

This application is related to U.S. Provisional Patent Application Ser. No. 60/120,526, filed Feb. 17, 1999, entitled "CACHE MISS SAVING FOR SPECULATIVE LOAD OPERATIONS," the disclosure of which is hereby incorporated by reference in its entirety.

BACKGROUND OF THE INVENTION

The present invention relates generally to processors and computing systems, and more particularly to systems and methods for decreasing the execution time of instructions in explicitly parallel instruction computing (EPIC) systems that support speculation and predication.

Many practical applications require processing of very large amounts of information in a short period of time. One of the basic approaches to minimizing the time to perform such computations is to apply some sort of parallelism, so that tasks which are logically independent can be performed in parallel. This can be done, for example, by executing two or more instructions per machine cycle, i.e., by means of instruction-level parallelism. Thus, in a class of computers using superscalar processing, hardware is used to detect independent instructions and execute them in parallel, often using techniques developed in the early supercomputers.

Another approach to exploiting instruction level parallelism is used by the Very Long Instruction Word (VLIW) processor architectures in which the compiler performs most instruction scheduling and parallel dispatching at compile time, thereby reducing the operating burden at run time. By moving the scheduling tasks to the compiler, a VLIW processor avoids both the operating latency problems and the large and complex circuitry associated with on-chip instruction scheduling logic. As known, each VLIW instruction typically includes multiple independent operations for execution by the processor in a single cycle. A VLIW compiler processes these instructions according to precise conformance to the structure of the processor, including the number and type of the execution units, as well as execution unit timing and latencies. The compiler groups the operations into a wide instruction for execution in one cycle. At run time, the wide instruction is applied to the various execution units with little decoding.

Programs compiled for a VLIW processor may employ predicated and speculative computations as known in the art. To improve efficiency, certain instructions may be executed speculatively and their results may then be retired or discarded if necessary. Predicated computations can be used to represent the control flow of a source program in a more optimal way by assigning predicate values for certain instructions and by removing some branch instructions. Also, it is known that profile data that characterizes program behavior can be obtained by performing test runs of the program.

One of the goals of a compiler optimizer is to reduce the execution time of the program being optimized through better usage of the caches and by discovering and using potential instruction parallelism. Many compiler techniques exploit the full predication and speculation features of the architecture to reduce the execution time. However, applying these techniques may lead to speculative code growth, that is, the amount of executed operations may be more than needed because of useless operations executed in store. Load operations may be among such useless operations.

The use of a speculative load operation can have some negative effects if a uselessly loaded value is not in the data cache (i.e., cache miss). Examples of such negative effects will be described with reference to the following source code:

```
if(COND1)
{
    if(COND2)
    {
        *q = ((*p) + x) *y;
    }
    else if(COND3)
    {
        *r = (*p) + z;
    }
}
```

The value *p, when loaded from a memory (main memory or cache) by the operation LOAD_OP, is useful when one of the following predicates is equal to TRUE:
  a)—(COND1==TRUE) && (COND2==TRUE)
  b)—(COND1==TRUE) && (COND2==FALSE) && (COND3==TRUE).

In other cases, the loaded value is not used and is therefore "useless," or has been "uselessly" loaded. However, such useless speculative execution of LOAD_OP in the case where *p is not in the data cache may lead to at least two negative effects:
  1. Consumers of the value loaded by LOAD_OP (ADD_OPs in the present example) are delayed until the memory access is complete. This will typically stall the entire CPU.
  2. The value *p when speculatively loaded from the main memory may result in some useful data being removed from the data cache.

In both cases, the useless speculative execution of the load operation leads to a delay for calculations that have to be executed. It is therefore desirable to at least partially eliminate such situations so as to increase the overall execution speed of the computer system.

SUMMARY OF THE INVENTION

The present invention provides methods to partially eliminate problems associated with a cache miss for a speculative load operation when a uselessly loaded value is not in the data cache. The cache miss savings transformations of the present invention are useful for any explicitly parallel instruction computing (EPIC)-type architecture with speculation and full predication support, such as a VLIW architecture.

According to the invention, a compiler optimizer analyzes various criteria to determine whether a cache miss savings transformation is useful. Depending on the results of the analysis, the load operation and/or the successor operations to the load operation are transferred into a predicated mode of operation to enhance overall system efficiency and execution speed.

According to an aspect of the invention, a compiler optimization method is provided for preventing delays associated with a speculative load operation on a data when the data is not in the data cache of a processor. The method typically includes the steps of identifying the speculative load operation in a set of scheduled operations, wherein the set of operations includes one or more operations that are successors to the load operation, determining a first parameter defining a maximum number of operations that can be added to optimize the set of operations, and determining a second parameter defining a maximum possible critical path increase in terms of processor cycles. The method also typically includes the step of, for each successor operation, finding a nearest predicate, wherein a first value of the nearest predicate indicates that all execution paths from the successor operation will terminate without a result (idleness), and determining a first number of operations needed to obtain the nearest predicate The method also typically includes the steps of determining a predicate for:the speculative load operation by determining a disjunction of all successor operation predicates, and determining a second number of operations needed to obtain the load operation predicate, estimating the probability of speculative load operation idleness based on probabilities of predicate values in profile feedback information, checking whether the second number of operations is less than or equal to the first parameter, whether the critical path increase due to the added predicated dependence from the step of generating the load operation predicate is equal to zero or less than the second parameter, and whether the probability of speculative load operation idleness is not equal to zero. If the checking results are all true, the method also typically includes the step of transferring the load operation into a predicated mode of execution. If any of the checking results are false, and the probability of speculative load operation idleness is not equal to zero, the method typically comprises the steps of, for each successor operation, checking whether the first number of operations is less than or equal to the first parameter, and whether the critical path increase due to the added predicated dependence from the step of generating the predicates to the successor operations is less than or equal to the second parameter, and if these checking results are true, thereafter transferring each successor operation into a predicated mode of execution.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

In the Figures, similar components and/or features have the same reference label. Further, various components of the same type are distinguished by following the reference label by a dash and a second label that distinguishes among the similar components. If only the first reference label is used in the specification, the description is applicable to any one of the similar components having the second label.

FIG. 3 illustrates an example of a flow semantics representation of a source code segment for which the techniques of the present invention are useful; and FIGS. 4 and 5 illustrate two modes of a cache miss saving transformation according to the present invention.

DESCRIPTION OF THE SPECIFIC EMBODIMENTS

Figure 1:
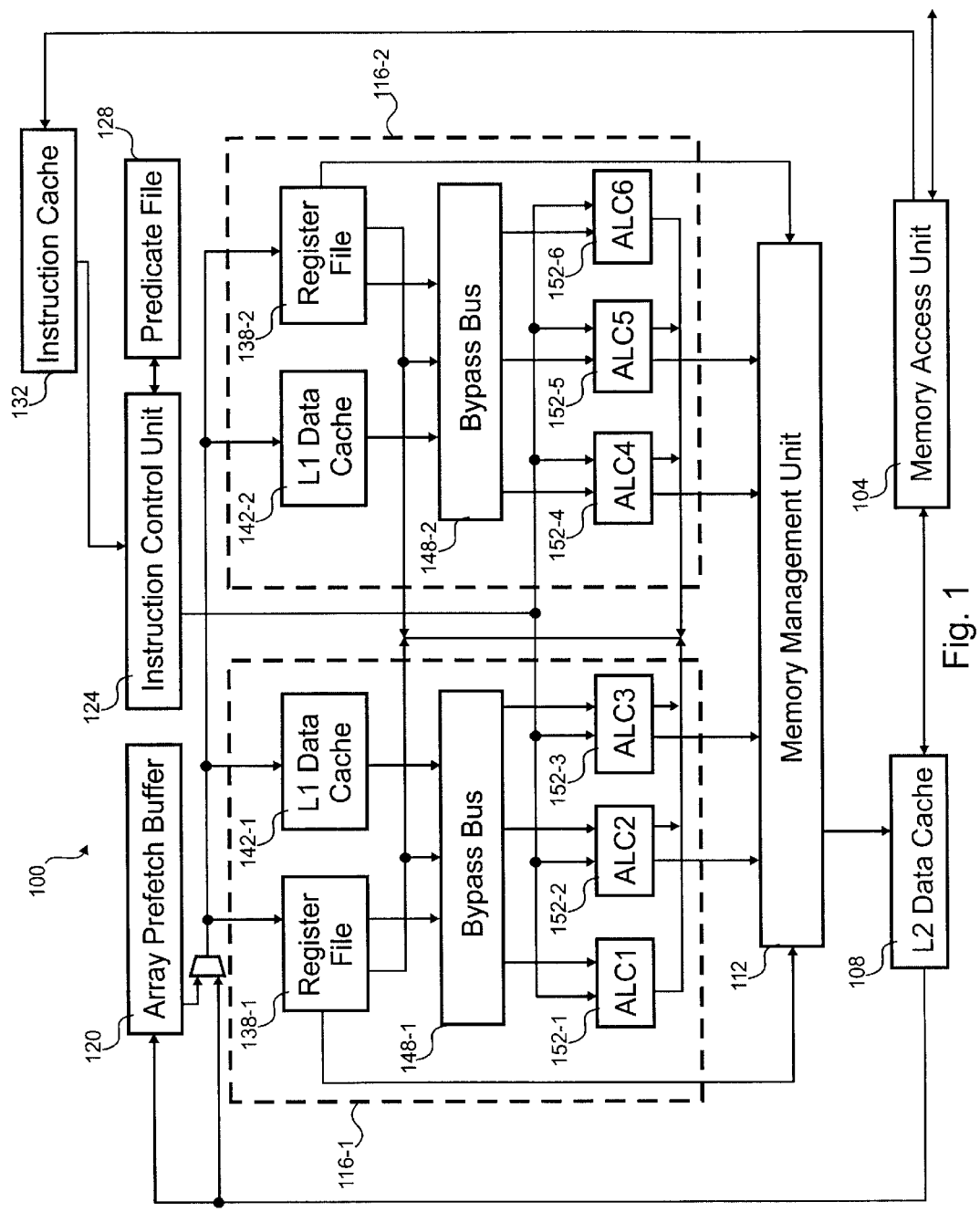
FIG. 1 is an overview block diagram of an embodiment of a processor according to an embodiment of the present invention.

Referring first to FIG. 1, an overview block diagram of an embodiment of an explicitly parallel instruction computing (EPIC) system 100 is shown. EPIC system 100 preferably provides speculation and full prediction support. This system or microprocessor 100 employs mechanisms to avoid the code inefficiencies in traditional VLIW machines to increase the number of instructions processed per cycle. To that end, this architecture moves the complex job of instruction scheduling from the microprocessor 100 to the compiler. Included in this embodiment 100 are a memory access unit 104, level two (L2) data cache 108, a memory management unit 112, two processing clusters 116, an array prefetch buffer 120, an instruction control unit 124, a predicate file 128, and an instruction cache 132.

Processing is divided between the two processing clusters 116. Each processing cluster 116 has a general purpose register file 138, a level one (L1) data cache 142, a bypass bus 148, and three arithmetic logic channels (ALCs) 152. The register files 138 and L1 data caches 142 are unified between the clusters 116 to reduce data shuffling, eliminate fragmentation loss, and eliminate memory incoherence.

The memory access unit 104 is an interface for communicating between the microprocessor 100 and external memory at an exchange rate of up to four information words transferred during a cycle. The memory access unit contains an entry buffer for memory requests and a crossbar of four data and one group instruction cache 132 memory access channels to four physical memory channels. The two least significant bits (LSBs) of physical addresses are the physical memory channel number.

To decrease the number of accesses to memory, the L1 data caches 142 and the L2 data cache buffer data and the instruction cache 132 buffers instructions. In one embodiment, the instruction cache 132 is sixty-four kilobytes (KB) large and has a 4-way configuration, the L1 data cache 142 is eight KB large, and the L2 data cache 108 is two hundred and fifty-six KB large and has a four bank, two-way, configuration. The instruction cache 132 contains wide instruction words in packed form which is the same way the wide instructions are stored in memory. Other embodiments could increase cache 108, 132, 142 sizes and/or configurations, if sufficient die area is available.

The memory management unit (MMU) 112 in one embodiment contains a four-port data translate lookaside Buffer (DTLB) with sixty-four entries and performs hardware search in the page table of DTLB in the case of a cache miss. The MMU 112 also contains disambiguation memory for checking rearrangement correctness of load and store operations, performed by an optimizing compiler.

The array prefetch buffer (APB) 120 is used to prefetch from memory array elements for loops. In one embodiment, APB 120 includes a four-channel first-in first-out (FIFO) buffer and contains forty-eight registers in each channel. The registers are preferably at least sixty-four bits wide. Data are transferred from APB 120 to the general purpose register files 138 when the data are ready.

The instruction control unit 124 generates wide instruction words in an unpacked form, transforms indirect based operands addresses of wide instruction words to absolute addresses in a register file 138, checks the conditions of the wide instruction words, and distributes the wide instruction words to the arithmetic logic channels 152. The instruction control unit 124 also checks instruction issue conditions, such as no exception conditions, no interlock conditions between other arithmetic logic channels 152, and availability of operands in the register file 138.

The predicate file 128 stores predicate values generated by integer and floating point compare operations. Predicate values are used to control the conditional execution of operations and are used to move branch conditions to the end of software loops. Included in the predicate file 128 are thirty-two predicate registers that are each two-bits wide. One bit in each predicate register holds the predicate value and the other bit holds an inverse of the predicate value.

There are two general-purpose register files 138, one register file 138 for each processing cluster 116. In one embodiment, there are two hundred and fifty-six registers in the register file 138 and each register is sixty-four bits wide. Both floating point and integer operations use the same register file 138 and ports to that register file 138. Each copy of the register file 138 has ten physical read and ten physical write ports for a total of twenty logical read and ten logical write ports. Data are preferably written to both register files 138 and the L1 data caches 142 to ensure memory coherency.

The register file 138 has a pipelined design and uses the same data lines for read and write with a half clock shift. There are allocated less than two clock cycles in the microprocessor pipeline for access the data in the register file 138. The large size of the register file 138 of this embodiment provides for fast execution of code because the register file 138 holds an increased number of intermediate results and local variables from the running code. This size of the register file 138 substantially decreases the number of memory accesses.

Procedure calls and program boundaries require considerable time to save and restore a large number of registers. For this reason, the microprocessor 100 supports a variable size register window mechanism with a current procedure register base that points to the beginning of current procedure area in the register file 138 or predicate file 128. A real physical register address is calculated by adding an increment value from the register address in instruction to the value of procedure base. On a procedure call or program boundary, the window is advanced by adding to the procedure register base.

There are six ALCs 152 in the microprocessor 100 arranged with three ALCs 152 in each processing cluster 116. The ALCs 152 work in parallel and have nearly the same sets of arithmetic and logic operations. Table I shows which operations may be executed by which ALCs 152 according to one embodiment. All ALCs 152 receive operands from register file 138 and bypass buses 148. The bypass busses 148 relieve bus conflicts when delivering the operators for some operations.

TABLE I

| Operation | ALC Number | | | | | |
|---|---|---|---|---|---|---|
| | 1 | 2 | 3 | 4 | 5 | 6 |
| Integer ALC | x | x | x | x | x | x |
| Integer Combined | | x | | | x | |
| Load/Store L1 | x | | x | x | | x |
| Load/Store L2 | x | | x | x | | x |
| Floating Point Add (32/64 bit) | x | x | | x | x | |
| Floating Point Add (80 bit) | x | x | | x | x | |
| Multiply (32/64 bit) | x | x | | x | x | |
| Floating Point Multiply (80 bit) | x | x | | x | x | |
| Floating Point Multiply-Add (32/64 bit) | x | x | | x | x | |
| Divide (32 bit) | | | | | | x |
| Divide (64 bit) | | | | | | x |
| Floating Point Division (32/64 bit) | | | | | | x |
| Multimedia Extension Multiply/Shift | | x | | | x | |
| Multimedia Extension Add/Subtract | x | | | x | | |

Figure 2:
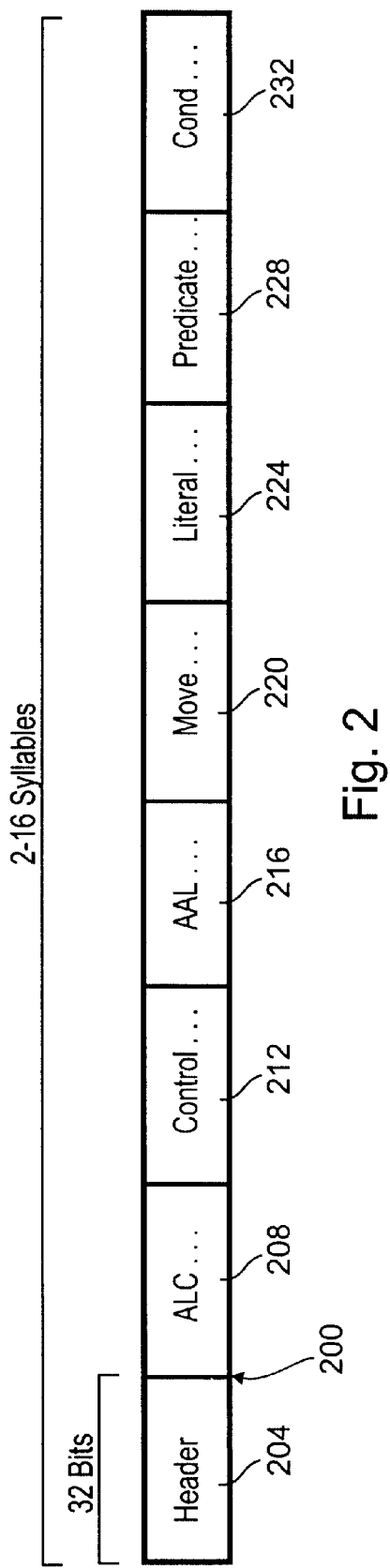
FIG. 2 is a diagram of an embodiment of a wide instruction word having a number of syllable types.

Referring next to FIG. 2, a diagram of an embodiment of a wide instruction word 200 having a number of syllable types is shown. The microprocessor 100 uses a variable length wide instruction word 200 having anywhere from two to sixteen syllables. The syllables are each thirty-two bits in length. The first syllable is a header 204 that specifies the number and type of syllables in the wide instruction word 200.

The syllables after the header 204 hold instructions that fall into a number of categories. Table II describes the various categories of instructions possible in the instruction word 200. This table also lists the maximum number of instructions possible in each category. Although this embodiment has a maximum of sixteen syllables, other embodiments could have a different amount, for example, thirty-two syllables.

TABLE II

| Syllable Type | Explanation | Max. Number |
|---|---|---|
| Header | Word Length and Structure | 1 |
| ALC | Execution Channel Function(s) | 6 |
| Control | Prepare to Branch Control | 3 |
| AAL | Additional ALC Function for Chained Operations | 2 |
| Move | Move Data from Prefetch Buffer to Register | 4 |
| Literal | Supply Literal to ALC | 4 |
| Predicate | Predicate Logic Calculations | 3 |
| Conditions | Predicate and ALC Masks | 3 |

FIG. 3 illustrates an example of a flow semantics representation of a source code segment for which the transformation techniques of the present invention are useful. Such a fragment of the flow semantics representation can be obtained, for example, from the following source code:

```
if(COND1)
    {
    if(COND2)
    {
        *q = ((*p) + x) *y;
    }
    else if(COND3)
    {
        *r = (*p) + z;
    }
}
```

In this example, the load operation (LOAD_OP) 310 is executed speculatively. Because LOAD_OP 310 is executed speculatively, it may cause a delay in the execution of consumers (e.g., add operations, or ADD_OPs, 320 in this example) of the speculative load operation because the memory access time is unknown at the time of compiling. With some input data the load operation may remain unconsumed, because all calculations dependent on the load operation may have no side effect. In this case, transferring consumers of the load operation or the load operation itself into the predicated execution mode can save execution time while such input data occur.

FIG. 4 illustrates one embodiment of a cache miss saving transformation according to the present invention. As shown, the LOAD_OP 310 is transferred into the predicated mode (as indicated by predicate dependence 312). Such a transformation will solve the problem for both blocking and non-blocking cache. FIG. 5 illustrates another embodiment of a cache miss saving transformation according to the present invention. As shown, the consumers 320 of LOAD_OP 310 are transferred into the predicated mode (as indicated by predicate dependencies 322 and 324). Such a transformation will solve the problem for non-blocking cache only.

For example, consider the situation when the cache miss saving transformations should solve the considered problem, i. e., all execution paths dependent on the load operation have no side effect (load is useless) and the loaded data isn't in the cache. If the cache is a non-blocking cache, then a real processor stall on cache miss will occur when the first load operation successor should use the loaded value. Therefore, transferring successors of the LOAD_OP into the predicated mode solves the problem of stalling on cache miss (transferring the LOAD_OP itself into the predicated mode solves this problem too, since the data won—t be loaded at all and calculations will continue with defective or illegal data). If the cache is a blocking cache, then a real processor stall on cache miss will occur while the load operation accesses the cache. Therefore, only transferring the LOAD_OP itself into the predicated model solves the problem of stalling on cache miss.

To determine the applicability of the transformations as shown in FIGS. 4 and 5, all data paths from the load operation to operations which cause the side effect, and which are in the predicated mode of execution, are analyzed. Criteria for application of the transformation include:

1). Finding predicates for the load operation itself and for all its successors. For each operation, a nearest predicate of operation usefulness can be defined in such a way that a false value of this predicate warrants the uselessness of the operation. The number of additional operations needed to calculate each predicate is also defined. For the load operation, such a predicate is a disjunction of the predicates of its successors, but a more general predicate that warrants the uselessness of the load operation can be used. In the example as illustrated in FIGS. 3–5, the predicate COND1 is used, it is more general that precise predicate of operation usefulness, but it does not require any additional calculations. When a more general predicate for the load operation is used, the operation remains speculative and in addition becomes conditional.

2). Restrictions imposed by the operation number needed for predicate calculation. This criterion is a boundary condition concerned with processor resources available in the considered block. A maximum number of operations that may be added in the block is estimated. The simple estimation is based on calculations of the earliest and latest start times of operations and is the difference between the number of operations in the block and all of the processor's resources available for it, that is, the product of the calculated block length in terms of processor cycles and ,the number of arithmetic channels of the processor. More complex estimation may be obtained by means of preliminary scheduling of the block with taking into account resource constraints and conflicts. The additional number of operations defined above in criteria 1) must be less than this estimation.

3). Restrictions imposed by the critical path changes. A new data dependence may be introduced if it does not lead to a sufficient lengthening of the critical path. This criterion is based on calculations of the earliest and latest start time of operations in accordance with dependences between them. The minimum execution time of the considered block is the longest path (i.e., "critical path") of a sequence of operations through the dependences (dependence graph). For these calculations, new predicated dependence(s) are inserted between operation(s), issuing predicate(s) and considered operation(s). Adding new dependences may either maintain the critical path of the block without changes, or it may increase the critical path. Therefore, a parameter defining a maximum critical path increase in terms of target processor cycles is defined. Possible increases in the critical path are determined while adding predicated dependences, and compared with the defined parameter. This parameter may be defined by the load access time of the primary cache, the cache miss cost (e.g., access time of other cache or main memory ) and/or the probability of load uselessness, if it is known.

For example, using the source code illustrated in FIGS. 3–5, suppose that it is not desired to increase the critical path. The critical path then goes through operations—[COND1], [COND1 && COND2](COND12), [COND1 && (!COND2) && COND3](COND123) and STORE_OP (R)(St). The critical path time $T_{cp}$ is: $T_{cp}=T_{cond1}+T_{cond12}+T_{cond123}+T_{st}$. If LOAD_OP 310 would be predicated by dependence on COND1 and the resulting new path length $T_{np}=T_{cond1}+T_{load}+T_{add}+T_{st}$ is greater than $T_{cp}$, the critical path would increase and this criterion would fail. This can be estimated by recalculating the earliest start time of LOAD_OP 310 after adding the predicated dependence. If the new earliest start time is greater than the first latest start time of LOAD_OP 310, the critical path would increase.

4). Probability of the uselessness of the load operation (which can be estimated in presence of profile data). This criterion is based on profile feedback information in the presence of profile data. Using profile information in the form of control flow path probabilities, predicate value probabilities (true or false) are estimated and then the probability of load operation uselessness is estimated. Using this information together with criteria 2) and 3) above, helps determine with better efficiency whether to apply the transformation to load operations (e.g., transferred to predicate mode of execution).

An example of such transformations will be described with reference to FIGS. 4 and 5. If all criteria 1)–4) are satisfied for load operation 310 (that is a predicate of usefulness is defined, it exists or can be simply calculated, dependence between predicate calculation and the load operation does not lead to the sufficient lengthening of the critical path and the estimated probability of the uselessness of the load operation is not equal to zero) then the necessary predicate calculation (if needed) is added and load operation 310 is transferred to the predicated mode of execution as shown in FIG. 4. Else, if all criteria 1)–3) are satisfied for the all successors of load operation 310, then load operation 310 remains unconditional but all its successors, e.g., operators 320, are transferred to the predicated mode of execution as shown in FIG. 5.

The above criteria analysis and transformation processes are preferably performed in software, e.g., using the compiler (which can :be represented as an optimizer block in the Figures, although no representation illustrated). In particular, the criteria are analyzed in an analyzer portion of the optimizer and the transformations are performed in a transformation portion of the optimizer.

One of the goals of compiler optimization is transforming code to increase its performance. One important factor in optimization is scheduling operations to increase the speed program execution by utilizing predicated and speculative operations. The present invention relates to optimizing code executed on an Explicit Parallel Instruction Computing (EPIC) architecture with full predication and speculation support and performs the global task of detecting and refining potential parallelism of the source code being compiled. In one embodiment, the compiler transforms the source-code program represented as a set of Basic Blocks into Extended Scalar Blocks (ESBs) by applying a compiler technique called if-conversion. Extended Scalar Blocks are regions of the predicated code where all dependencies between operations (e.g., control flow, data flow, predicate dependencies and memory address conflicts) are represented explicitly as a relation between two operations for a considerable number of operations. For each ESB the compiler works out the critical path which is defined as a sequence of operations that will take the longest CPU time and can't be executed in parallel because of dependencies.

While the invention has been described byway of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of preventing delays associated with a speculative load operation on a data when the data is not in the data cache of a processor, comprising the steps of:
   a) identifying the speculative load operation in a set of scheduled operations, wherein the set of operations includes one or more operations that are successors to the load operation;
   b) determining a first parameter defining a maximum number of operations that can be added to optimize the set of operations;
   c) determining a second parameter defining a maximum possible critical path increase in terms of processor cycles;
   d) for each successor operation, finding a nearest predicate, wherein a first value of the nearest predicate indicates that all execution paths from the successor operation will terminate without a result (idleness), and determining a first number of operations needed to obtain the nearest predicate;
   e) determining a predicate for the speculative load operation by determining a disjunction of all successor operation predicates, and determining a second number of operations needed to obtain the load operation predicate;
   f) estimating the probability of speculative load operation idleness based on probabilities of predicate values in profile feedback information;
   g) checking:
      whether the second number of operations is less than or equal to the first parameter, whether the critical path increase due to the added predicated dependence from step e) is equal to zero or less than the second parameter, and whether the probability of speculative load operation idleness is not equal to zero; and
   h) if the checking results of step g) are all true, thereafter transferring the load operation into a predicated mode of execution.

2. The method of claim 1, wherein if any of the checking results of step g) are false, and the probability of speculative load operation idleness is not equal to zero, the method further comprises the steps of:
   i) for each successor operation, checking whether the first number of operations is less than or equal to the first parameter, and whether the critical path increase due to the added predicated dependence from step d) is less than or equal to the second parameter; and
   j) if checking results of step i) are true, thereafter transferring each successor operation into a predicated mode of execution.

3. A compiler optimization method for partial saving of losses induced by cache miss of speculative load operations, comprising the steps of:
   a) identifying, in a set of scheduled operations, a speculative load operation having one or more successor operations;
   b) determining a first architecture-dependent parameter defining a maximum number of operations that can be added to optimize the set of operations;
   c) determining a second architecture dependent parameter defining a maximum possible critical path increase in terms of processor cycles;
   d) for each successor operation, finding a nearest predicate, wherein a first value of the nearest predicate indicates that all execution paths from the successor operation will terminate without a result (idleness), and determining a first number of operations needed to obtain the nearest predicate;
   e) determining a predicate for the speculative load operation by determining a disjunction of all successor operation predicates, and determining a second number of operations needed to obtain the load operation predicate;
   f) estimating the probability of speculative, load operation idleness based on probabilities of predicate values in profile feedback information;
   g) checking:
      whether the second number of operations is less than or equal to the first parameter, whether the critical path increase due to the added predicated dependence from step e) is equal to zero or less than the second parameter, and whether the probability of speculative load operation idleness is not equal to zero; and
   h) if the checking results of step g) are all true, thereafter transferring the load operation into a predicated mode of execution.

4. The method of claim 3, wherein step h) includes the steps of creating new operations, if needed, to generate the load operation predicate, and setting the predicated dependence from the operation generating said predicate to the load operation.

5. The method of claim 3, wherein if any of the checking results of step g) are false, and the probability of speculative load operation idleness is not equal to zero, the method further comprises the steps of:
   i) for each successor operation, checking whether the first number of operations is less than or equal to the first parameter, and whether the critical path increase due to the added predicated dependence from step d) is less than or equal to the second parameter; and
   j) if checking results of step i) are true, thereafter transferring each successor operation into a predicated mode of execution.

6. The method of claim 5, wherein step j) includes the steps of creating new operations, if needed, to generate the successor operation predicate for each successor operation, and setting the predicated dependence from operation generating said predicate to the successor operation for each successor operation.

7. The method of claim 3, wherein the set of scheduled operations is an extended scalar block (ESB).

8. A compiler optimization method for partial saving of losses induced by cache miss of speculative load operations, comprising the steps of:

a) identifying, in a scheduled extended scalar block (ESB) including a set of scheduled operations, a speculative load operation having one or more successor operations;

b) determining a first architecture-dependent parameter defining a maximum number of operations that can be added to optimize the ESB;

c) determining a second architecture dependent parameter defining a maximum possible critical path increase in terms of target processor cycles;

d) for each successor operation, finding a nearest predicate, wherein a first value of the nearest predicate indicates that all execution paths from the successor operation will terminate without a result (idleness), and minimizing a first number of operations needed to obtain the nearest predicate;

e) determining a predicate for the speculative load operation by determining a disjunction of all successor operation predicates, and determining a second number of operations needed to obtain the load operation predicate;

f) estimating the probability of speculative load operation idleness based on probabilities of predicate values in profile feedback information if the profile feedback information is available;

g) checking whether the number of additional operations needed to obtain the load operation predicate is less than or equal to the first parameter, and whether the critical path increase due to the added predicated dependence from the operation generating the predicate to the load operation is equal to zero or less than the second parameter, and whether the probability of speculative load operation idleness is not equal to zero; and h) if the checking results of step g) are true, then creating new operations, if needed, to generate the load operation predicate, and setting the predicated dependence from the operation generating said predicate to the load operation, and setting the predicated mode of execution to the load operation.

9. The method of claim 8, wherein if the checking results of step g) for the speculative load operation are false and the probability of speculative load operation idleness is not equal to zero, the method further comprises the steps of:

i) checking whether the number of additional operations needed to obtain each successor operation predicate is less than or equal to the first parameter, and whether the critical path increase due to the added predicated dependence from the operation generating the predicate to the successor operation is less than or equal to the second parameter for each successor operation; and j) if the checking results of step i) are true, then creating new operations, if needed, to generate the successor operation predicate for each successor operation, and setting the predicated dependence from the operation generating the predicate to the successor operation for each successor operation, and setting the predicated mode of execution to each successor operation.

* * * * *